Figure 1:
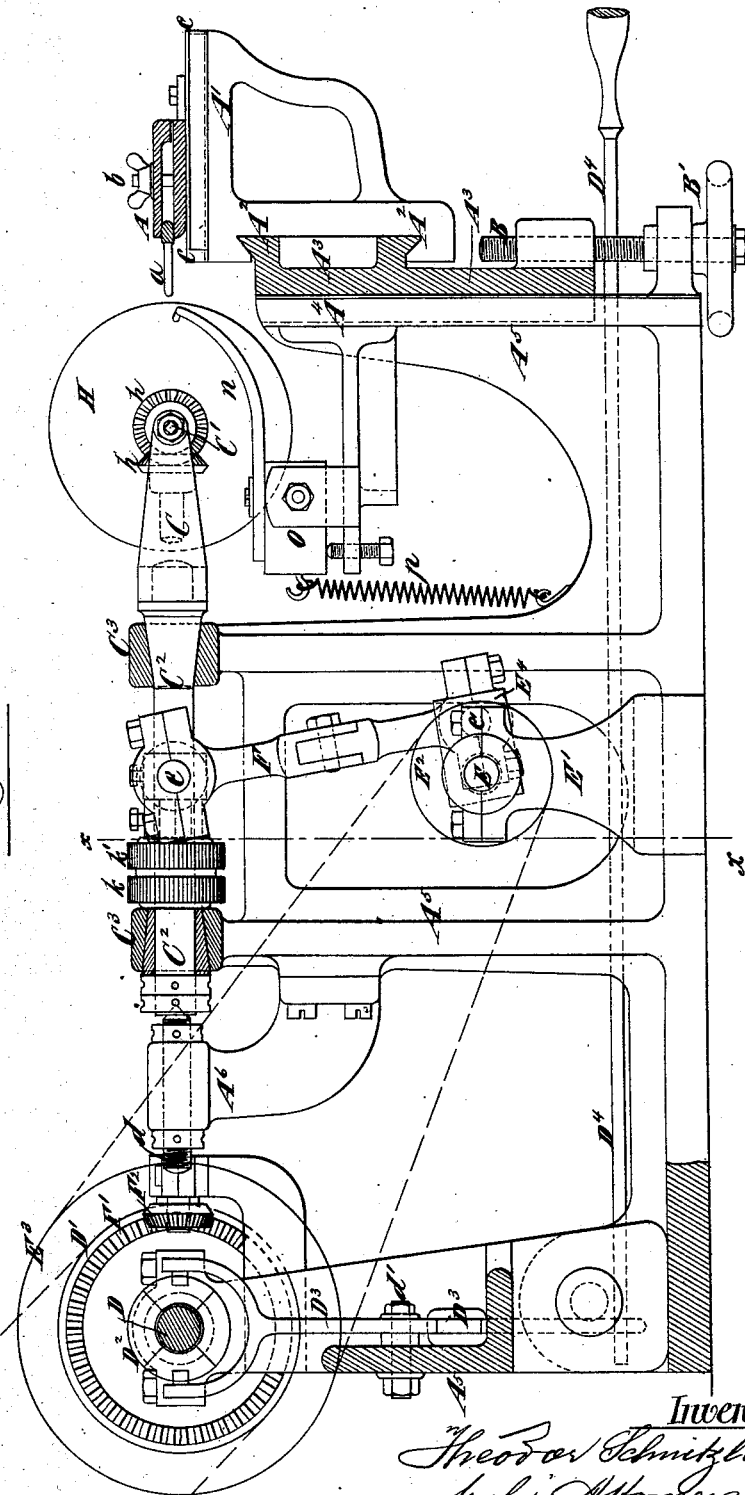

(No Model.) 2 Sheets—Sheet 1.

T. SCHNITZLEIN.
Machine for Cutting and Finishing the Teeth of Combs.

No. 235,461. Patented Dec. 14, 1880.

Witnesses:— Inventor:—

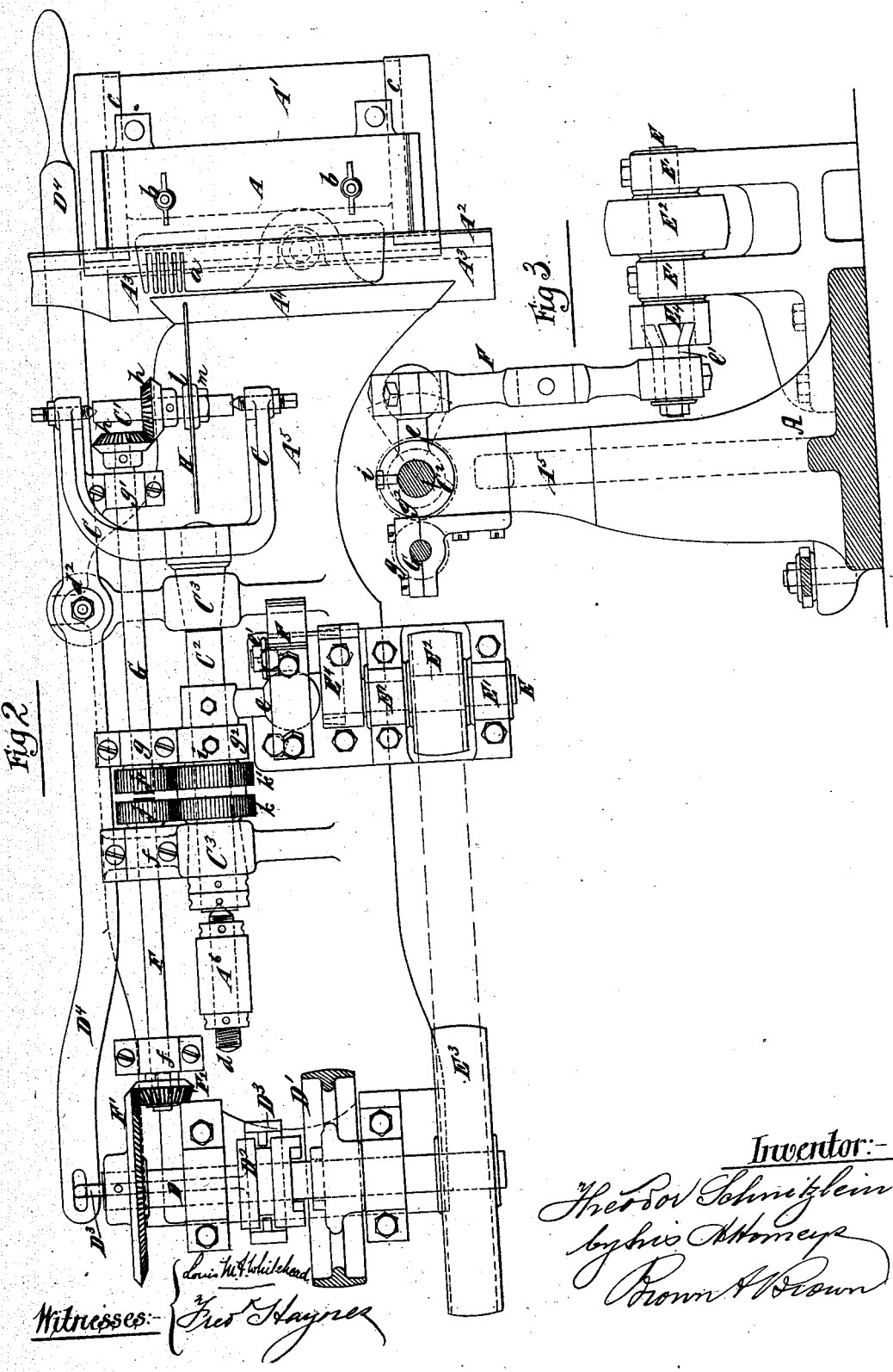

UNITED STATES PATENT OFFICE.

THEODOR SCHNITZLEIN, OF HAMBURG, GERMANY.

MACHINE FOR CUTTING AND FINISHING THE TEETH OF COMBS.

SPECIFICATION forming part of Letters Patent No. 235,461, dated December 14, 1880.

Application filed October 5, 1880. (No model.)

*To all whom it may concern:*

Be it known that I, THEODOR SCHNITZLEIN, of Hamburg, in the Empire of Germany, have invented certain new and useful Improvements in Machinery for Cutting and Finishing the Teeth of Combs and other Articles, of which the following is a specification.

In the ordinary method of manufacturing combs the teeth are first cut by a rotating saw or cutter, then the sides of the teeth are polished by a rotary polishing-disk, and afterward what is known as "edging off," which consists in rounding off the edges of the teeth, is done by hand.

The object of my invention is to provide a machine in which the three operations of cutting, polishing, and edging off may be all done without removing the combs from their securing or holding devices.

To this end my invention consists in the combination, in a machine for cutting and polishing the teeth of combs, of a rotary mandrel or arbor carrying a saw or polishing-disk, a yoke or frame comprising bearings for said mandrel or arbor, and a shaft to which said yoke or frame is rigidly attached, having its axis in the same vertical plane as said disk or saw, and having an oscillating motion imparted to it by suitable mechanism for giving the sides of the comb-teeth a rounded contour.

The invention also consists in the combination, with such turning or oscillating frame or yoke and shaft, and a mandrel or arbor for a cutter or polishing-disk supported in bearings in said frame or yoke, of a novel arrangement of mechanism for imparting a rotary motion to said mandrel or arbor.

The invention also consists in various novel details of construction and combinations of parts hereinafter fully described.

In the accompanying drawings, Figure 1 represents a partly sectional side elevation of a machine embodying my invention. Fig. 2 represents a plan thereof, and Fig. 3 represents a transverse section of a portion of the machine upon the dotted line $x$ $x$, Fig. 1.

Similar letters of reference designate corresponding parts in all the figures.

A designates a holder, in which a comb, $a$, is securely clamped by means of binding-screws $b$. This holder is adapted to be adjusted toward the left or right, longitudinally of the machine, along guides $c$, upon a bracket-support, A', and said bracket-support is adapted to be adjusted from one side to the other of the machine along a horizontal dovetailed guide or way, A$^2$, attached to or formed upon a base piece or plate, A$^3$. The base piece or plate A$^3$ engages with a vertical dovetailed guide or way, A$^4$, attached to or formed upon the frame A$^5$ of the machine, and by means of a screw, B, and hand-wheel B' the whole arrangement just described may be adjusted vertically. It will therefore be seen that the holder A may be adjusted in a manner similar to the compound rest of a lathe.

C designates a yoke or frame, in which are the bearings for a mandrel or arbor, C', and from which projects a long shank or shaft, C$^2$, which is capable of turning when desired in bearings C$^3$, comprised in or attached to the frame A$^5$. At the end of the shaft C$^2$ is a bracket, A$^6$, in which is a set-screw, $d$, which bears against the end of said shaft and provides for taking up wear.

D designates a driving-shaft, to which motion may be imparted by a belt upon a pulley, D', which is loose on said shaft, but which may be locked in engagement therewith by means of a clutch, D$^2$, which may be shifted toward and from said pulley by a lever, D$^3$, which is pivoted at $d'$, and curved or bent so as to extend to one side of the machine.

D$^4$ designates a hand-lever pivoted at $d^2$, having a handle at one end, and engaging at the other end with the end of the clutch-lever D$^3$. By this means the machine may be stopped or started at pleasure.

Any suitable means may be employed for imparting a turning or oscillating motion to the shaft C$^2$, a very convenient form of mechanism being here shown.

E designates a short shaft arranged transversely of the machine, mounted in bearings E', and carrying a pulley, E$^2$.

Motion may be imparted to the shaft E by means of a belt from a pulley, E$^3$, upon the driving-shaft D.

From the shaft C$^2$ projects a transverse arm, $e$, and F$^5$ designates a connecting-rod having a ball-and-socket connection with said arm, and receiving motion from a crank-pin, $e'$, secured in a crank, E⁴, upon the shaft E, so that it may be adjusted to give a greater or less oscillating movement to the shaft C². An eccentric might be substituted for the crank E⁴.

Inasmuch as the arbor C' receives an oscillating or swinging movement because of its connection with the yoke C, a peculiar arrangement of mechanism is necessary for imparting motion to it, which I will now describe.

F designates a shaft mounted in fixed bearings $f$, and receiving a rapid rotary motion from the driving-shaft D by means of a bevel-gear wheel, F', and a pinion, F².

G designates a shaft mounted in bearings $g\ g'$, and employed for imparting motion to the arbor or mandrel C' by means of bevel-pinions $h\ h$. The bearing $g$ for the shaft G comprises a collar, $g^2$, which fits upon and is secured rigidly to the shaft C² by means of a set-screw, $i$, and the bearing $g'$ is formed upon or attached to the yoke C.

By this arrangement of bearings it will be understood that the shaft G is, by the partial turning or oscillation of shaft C², swung in an arc about the said shaft C², the pinions $h\ h$ being always in engagement.

In order to impart motion from the shaft F, which is in fixed bearings, to the shaft G, which is in movable bearings, I fix upon the adjacent ends of the two shafts spur-wheels or pinions $j\ j'$, which engage with two wheels or pinions, $k\ k'$, loosely mounted on the shaft C², and made in one piece or permanently connected together. The gear-wheel $k$, which receives motion from the wheel $j$, transmits its motion, through the wheels $k'$ and $j'$, to the shaft G, which is thereby rotated, and in turn imparts motion to the arbor or mandrel C'. The said arbor or mandrel is provided with collars $l$ and a nut, $m$, which provide for securing to said arbor or mandrel a circular saw for cutting the teeth or a polishing-disk, H, for polishing their sides, the latter only being here shown.

As here represented, the axis of the shaft C² is in the same vertical plane as the saw or polishing-disk and in the same horizontal plane as the center thereof; but it may be either above or below said center, if desirable, if it is always in the same vertical plane as the saw or disk.

After a circular saw has been secured upon the arbor or mandrel C' a comb, $a$, is clamped in the holder A, and the holder moved up toward the saw until the teeth are cut to the proper depth. After the teeth are all cut a polishing-disk is secured upon said arbor or mandrel and the teeth are dressed and smoothed off. The swinging of the saw and disk will give the sides of the teeth a rounded profile, the cutting of the teeth and the edging off being done by the saw, and the finishing of the sides and edges by the polishing-disk.

In order to support the teeth while being cut, I may employ a spring-arm, $n$, fastened to a pivoted block, $o$, and which is, by the tension of a spring, $p$, held up against the under side of the teeth. This arrangement is, however, old and forms no part of my invention.

Although my machine is principally intended for forming the teeth of combs, it might be used for other purposes of like nature.

What I claim as my invention, and desire to secure by Letters Patent, is—

1. In a machine for cutting and polishing the teeth of combs, the combination of a rotary arbor or mandrel carrying a saw or polishing-disk, a yoke or frame comprising bearings for said arbor or mandrel, and a shaft to which said yoke or frame is rigidly attached, having its axis in the same vertical plane as said saw or disk, and having an oscillating motion imparted to it by suitable mechanism, substantially as and for the purpose specified.

2. In a machine for cutting and polishing the teeth of combs, the combination, with a yoke or frame, an arbor or mandrel for a saw or disk supported therein, and a shaft extending therefrom, of mechanism for rotating said arbor or mandrel, an arm projecting transversely from said shaft, a crank or eccentric, and a connecting-rod for imparting motion from said crank to said arm, substantially as and for the purpose specified.

3. In a machine for cutting and polishing the teeth of combs, the combination of a yoke or frame, C, supporting an arbor or mandrel, C', a saw or polishing-disk upon said arbor or mandrel, a shaft, C², to which said yoke or frame is rigidly attached, having its axis in the same vertical plane as said saw or disk, and having an oscillating motion imparted to it by suitable mechanism, the shafts F G, the bevel-gear wheels $h\ h$, for imparting motion to the arbor or mandrel C', the wheels $j\ j'$ upon the shafts F G, and the permanently-connected wheels $k\ k'$, receiving motion from the shaft F and transmitting it to the shaft G, all substantially as specified.

4. In a machine for cutting and polishing the teeth of combs, the combination of a yoke or frame, C, supporting an arbor or mandrel, C', the shaft C², having a projecting arm, $e$, a connecting-rod, F⁵, and crank E⁴, for imparting an oscillating motion to the shaft C², shafts D, F, and G, a wheel, F', and pinion F², for imparting motion to the shaft F, bevel-wheels $h\ h$, for imparting motion to the arbor or mandrel C', and the wheels $j\ j'$, and permanently-connected wheels $k\ k'$, for imparting motion from the shaft F to the shaft G, all substantially as specified.

THEODOR SCHNITZLEIN.

Witnesses:
A. SCHAPER,
J. ENGEL.